(12) United States Patent
Rao et al.

(10) Patent No.: US 11,314,552 B1
(45) Date of Patent: Apr. 26, 2022

(54) DYNAMIC DETERMINATION OF REVERSE LOGISTICS

(71) Applicant: International Business Machines Corporation, Armonk, NY (US)

(72) Inventors: Siddharth R Rao, Bangalore (IN); Sandeep Narasimha, Plano, TX (US); Amit Chauhan, Plano, TX (US); Pradyumnha Gopalkrishna Kowlani, Foster City, CA (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 17/114,588

(22) Filed: Dec. 8, 2020

(51) Int. Cl.
 *G06F 9/48* (2006.01)
 *G06F 11/34* (2006.01)

(52) U.S. Cl.
 CPC .......... *G06F 9/4881* (2013.01); *G06F 9/4831* (2013.01); *G06F 11/3466* (2013.01)

(58) Field of Classification Search
 CPC ... G06F 9/4881; G06F 9/4831; G06F 11/3466
 See application file for complete search history.

(56) References Cited

U.S. PATENT DOCUMENTS

| | | | |
|---|---|---|---|
| 7,958,061 B1 | 6/2011 | Antony | |
| 7,966,334 B1 * | 6/2011 | Bezos | G06Q 30/06 707/748 |
| 8,036,905 B2 | 10/2011 | Siegel | |
| 10,475,040 B2 | 11/2019 | Singh | |
| 10,657,591 B1 | 5/2020 | Chen | |
| 2004/0194056 A1 * | 9/2004 | Combs | G06Q 30/016 717/104 |
| 2009/0299881 A1 * | 12/2009 | Del Rosario | G06Q 10/087 705/28 |
| 2017/0323264 A1 * | 11/2017 | Subramanian | G06Q 10/087 |
| 2020/0126027 A1 | 4/2020 | Mahajan | |
| 2020/0175528 A1 | 6/2020 | Bazari | |
| 2022/0044204 A1 * | 2/2022 | Cella | G06N 3/08 |

OTHER PUBLICATIONS

"Simplify the Everyday Lives of Consumers", Copyright © 2012-2020 Narvar Inc., 5 pages, <https://corp.narvar.com/>.

(Continued)

*Primary Examiner* — Benjamin C Wu
(74) *Attorney, Agent, or Firm* — Aaron N. Pontikos

(57) ABSTRACT

Embodiments of the present invention provide a computer system, a computer program product, and a method that comprises receiving data associated with an initiation of a process; dynamically determining a sequence of a plurality of sub-processes associated with the received data based the initiated process; dynamically prioritizing the determined sequence of the plurality of sub-processes associated with the received data based on an analysis of eligible variations and a pre-stored database of variations associated with each respective sub-process; dynamically performing the process based the prioritized sequence of the plurality of sub-processes associated with the received data; and transmitting a result of the dynamic prioritization of the determined sequence of a plurality of variations to a user interface of another computing device.

20 Claims, 3 Drawing Sheets

(56) References Cited

OTHER PUBLICATIONS

Biswas, Chiranjib, "Efficiency Improvement in Reverse Logistics and Examining the Relationships between Refund, Return Policy, Quality Policy and Pricing Strategy in E-Commerce Business," Thesis, University of Windsor, Sep. 27, 2018, 65 pages.

Mazareanu, E., "Return deliveries—costs in U.S. 2017-2020", May 26, 2020, © Statista 2020, 3 pages, <https://www.statista.com/statistics/871365/reverse-logistics-cost-united-states/>.

Westmaas, D., "Product Returns in the E-Commerce Market, Explorative Study into the Applicability of Machine Learning," Research Paper, Tu Delft, 2018, 12 pages.

* cited by examiner

DYNAMIC DETERMINATION OF REVERSE LOGISTICS

BACKGROUND

The present invention relates generally to the field of supply chain logistics, and more specifically with reverse logistics.

In commerce, a supply chain is a system of organizations, people, activities, information, and resources involved in supplying a product or service to a consumer. Supply chain activities involve the transformation of natural resources, raw materials, and components into a finished product that is delivered to the end customer. In sophisticated supply chain systems, used products may re-enter the supply chain at any point where residual value is recyclable. Supply chains link value chains.

Reverse logistics is for all operations related to the reuse of products and materials. It is the process of moving goods from their typical final destination for the purpose of capturing value, or proper disposal. The reverse logistics process includes the management and the sale of surplus as well as returned equipment and machines from the hardware leasing business. Normally, logistics deal with events that bring the products towards the customer. In the case of reverse logistics, the resource goes at least one step back in the supply chain. For instance, goods move from the customer to the distributor or to the manufacturer. When a manufacturer's product normally moves through the supply chain network, it is to reach the distributor or customer. Any process or management after the delivery of the product involves reverse logistics. If the product is defective, the customer would return the product. The manufacturing firm would have to organize shipping of the defective product, testing the product, dismantling, repairing, recycling or disposing the product. The product would travel in reverse through the supply chain network in order to retain any use from the defective product.

SUMMARY

Embodiments of the present invention provide a computer system, a computer program product, and a method that comprises receiving data associated with an initiation of a process; dynamically determining a sequence of a plurality of sub-processes associated with the received data based the initiated process; dynamically prioritizing the determined sequence of the plurality of sub-processes associated with the received data based on an analysis of eligible variations and a pre-stored database of variations associated with each respective sub-process; dynamically performing the process based the prioritized sequence of the plurality of sub-processes associated with the received data; and transmitting a result of the dynamic prioritization of the determined sequence of a plurality of variations to a user interface of another computing device.

DETAILED DESCRIPTION

Embodiments of the present invention recognize the need for an improvement to reverse logistic systems due to an amount of unnecessary checks and balances performed using human labor required to return goods or services within current reverse logistic systems. Current reverse logistics systems are inefficient and require additional resources for return processes. Typically, reverse logistics systems span from the end customer all the way back to the original manufacture, which includes flow of returnable goods, flow of information (i.e., financial information) or both. Current reverse logistic systems require hard-wired return processes based on item attributes; handling variations in processes that are left to the discretion of customer care, warehouse, and service personnel to make a decision based on the data available; and siloed processes that themselves are hampered by the lack of complete information. Embodiments of the present invention improve the hard-wired return processes by determining the eligibility of various return sub-processes and variations using an artificial intelligence algorithm engine. Embodiments of the present invention remove the handling of variations that is generally left to human discretion by dynamically determining optimal decisions associated with the variations of returns based on received data using the artificial intelligence algorithm engine. Embodiments of the present invention improve the efficiency associated with soiled process due to lack of information by dynamically sequencing the eligible sub-process and re-evaluating contextualized return processes at predetermined milestones within the return process using the artificial intelligence algorithm engine. Embodiments of the present invention provide a dynamic determination of reverse logistic processes by receiving data associated with an initiation of a return of an item; dynamically determining a sequence of a plurality of sub-processes associated with the received data; dynamically determining a priority order based on the determined sequence associated with the plurality of sub-process; re-evaluating contextualized return processes at predetermined milestones within the return process; and transmitting a result of the determined priority order to another computing device.

Figure 1:
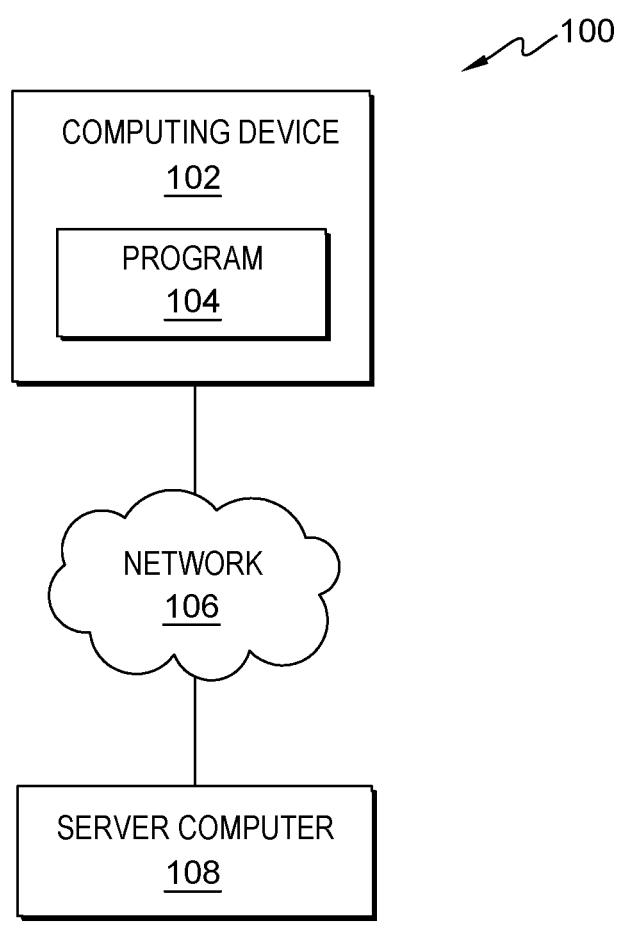
FIG. 1 is a functional block diagram depicting an environment with a computing device connected to or in communication with another computing device, in accordance with at least one embodiment of the present invention.

FIG. 1 is a functional block diagram of a computing environment 100 in accordance with an embodiment of the present invention. The computing environment 100 includes a computing device 102 and a server computer 108. The computing device 102 and the server computer 108 may be desktop computers, laptop computers, specialized computer servers, smart phones, wearable technology, or any other computing devices known in the art. In certain embodiments, the computing device 102 and the server computer 108 may represent computing devices utilizing multiple computers or components to act as a single pool of seamless resources when accessed through a network 106. Generally, the computing device 102 and the server computer 108 may be representative of any electronic devices, or a combination of electronic devices, capable of executing machine-readable program instructions, as described in greater detail with regard to FIG. 4.

The computing device may include a program 104. The program 104 may be a stand-alone program 104 on the computing device. In another embodiment, the program 104 may be stored on a server computer 108. In this embodiment, the program 104 improves the efficiency of reverse logistics systems by removing human discretion for the selection of an eligible return process and dynamically determining an optimal return process using an artificial intelligence algorithm engine. In this embodiment, the program 104 improves the efficiency of reverse logistic systems by receiving data associated with a return process initiation; dynamically determining a sequence of a plurality of sub-processes associated with the received data based on the return process; dynamically prioritizing an optimal sequence of a plurality of variations associated with each sub-process within the plurality of sub-processes of the received data; and transmitting a result of the dynamic prioritization of the optimal sequence of the plurality of variations to a user interface of another computing device. In this embodiment, the program 104 defines a return process as the steps associated with returning an item, good, or service within a supply chain. In this embodiment, the program 104 defines a sub-process as a milestone (i.e., step within the supply chain) within the return process that the program 104 analyzes when determining the optimal sequence of prioritization. For example, the program 104 identifies an eligibility for refund of an item, eligibility of repair of an item, and eligibility of return of an item as sub-processes within the return process. In this embodiment, the program 104 defines variations within each sub-process as a binary classification that provides an inclination on the optimal rank of the sub-process with respect to the plurality of sub-processes. For example, the program 104 identifies variations such as the item and product family, customer attributes, warranty & protection, past returns, return rate, resource availability, and scrap value.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computer 108, specifically the program 104 in accordance with a desired embodiment of the invention.

The server computer 108 may include the program 104 and may communicate with the computing device 102 via the network 106. In another embodiment, the program 104 may transmit the results of the prioritized sequence of sub-processes associated with the received data to the server computer 108.

Figure 2:
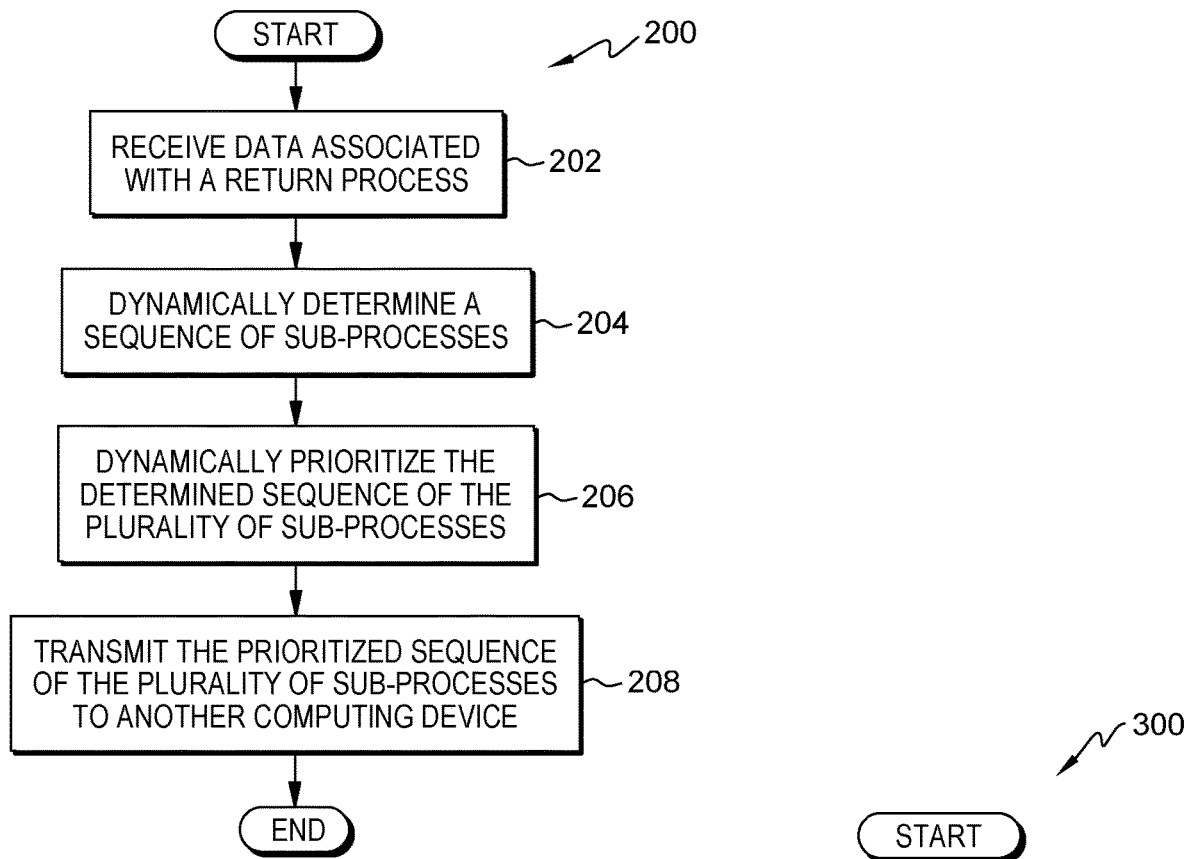
FIG. 2 is a flowchart illustrating operational steps for determining an eligibility of a plurality of sub-processes associated with reverse logistics, in accordance with at least one embodiment of the present invention.

FIG. 2 is a flowchart 200 illustrating operational steps for determining an eligibility of a plurality of sub-processes associated with reverse logistics, in accordance with at least one embodiment of the present invention.

In step 202, the program 104 receives data associated with a return process. In this embodiment, the program 104 receives data associated with an initiation of the return process of an item. In this embodiment, data is defined as information and details associated with a good or service. For example, the program 104 receives product characteristics and details of the purchaser as data associated with the return process. In this embodiment, the program 104 defines the item as a product, good, or service. In this embodiment, the program 104 defines return process as a step within a supply chain system, wherein the initiation would be a first step of the return process within the supply chain system, delivery would be a final step within the supply chain system, and at least one more milestone step depending on the complexity of the supply chain system. In this embodiment, the program 104 receives data associated within the return process by identifying the item associated with the return process. Then, the program 104 retrieves information associated with the identified item by performing a query on the identified item using a machine learning algorithm and artificial intelligence algorithm. For example, the program 104 receives data on an initiation of returning a golf club. In this example, the program 104 identifies the purchased golf club as the item to be returned within the return process and retrieves the purchase price, the location where it was shipped, the date of the purchase, product characteristics, details of the purchaser, any extended warranty purchased by the purchaser, return preference of the purchaser and the manufacturer of the golf club as received data associated with the return of the golf club. In another embodiment, the program 104 receives data associated with the return process by identifying an item using sensor devices and retrieving item characteristics associated with the identified item by performing a query of a database stored on a server computing device via a network, wherein the item characteristics are physical descriptors of the item and terms associated with a return of the item.

In step 204, the program 104 dynamically determines a sequence of sub-processes associated with the return process. In this embodiment and in response to retrieving additional information associated with the received data within the return the process, the program 104 dynamically determines a sequence of sub-processes by determining an eligibility of each sub-process within a plurality of sub-processes that is applicable to the return process of the item. For example, the program 104 determines that the sub-process associated with the identified golf club are return eligibility, repair eligibility, refund eligibility, return to supplier, and quality check needed. In this embodiment, the program 104 determines the eligibility associated with each respective sub-process by assigning a qualitative value to each respective sub-process within the plurality of sub-processes, wherein a sub-process that is applicable to the return process of the item receives a value of 1 and a sub-process that is not applicable to the return process of the item receives a value of 0. For example, the program 104 determines the sequence of the return eligibility of the identified golf club as 1, the repair eligibility of the identified golf club as 0 due to the golf club being unused, the refund eligibility of the identified golf club as 1, the return to supplier as 0 due to the golf club being purchased from a subsequent point within the supply chain other than the supplier, and the quality check needed as 1.

In step 206, the program 104 dynamically prioritizes the determined sequence of the plurality of sub-processes associated with the identified item within the return process. In this embodiment, the program 104 dynamically prioritizes the determined sequence of the plurality of sub-processes by analyzing the determined sequence of the plurality of sub-processes using an artificial intelligence determination algorithm engine; ranking each respective sub-process within the plurality of sub-processes based on the analysis of the determined sequence using a ranking algorithm; and updating the determined sequence based on the ranking of each respective sub-process within the plurality of sub-processes. This step will be further explained in FIG. 3.

In this embodiment, the program 104 analyzes the determined sequence of the plurality of sub-process by identifying a plurality of variations associated with the plurality of sub-processes associated with identified item using the artificial intelligence determination engine. In this embodiment, the program 104 defines the variations associated with each respective sub-process as a binary classification used to assist with the prioritization of the sub-process. For example, the program 104 identifies variations of reject and accept within the return eligibility sub-process and odd and even as variations within the exchange eligibility sub-process.

In this embodiment, the program 104 ranks each respective sub-process within the plurality of sub-processes by assigning a weighted value to each respective variation of identified sub-process with a weighted value of 1 and generating an overall return score by summing the assigned weighted values of the plurality variations associated with the sub-processes with a weighted value of 1. In this embodiment, the program 104 assigns a weighted value of 1 for each variation within the plurality of variations that are applicable to the return process of the identified item. In this embodiment, the program 104 assigns a weighted value of 2 for a sub-process preference of the user, wherein the sub-processes preference when eligible receives double the value of any eligible sub-process. In this embodiment, there is a scale from 1-5 associated with the ranking of the sub-processes and the sub-process with the highest total value is placed at the highest position within the ranking. For example, the program 104 is ranking a return sub-process, a refund sub-process, and a replace sub-process, wherein the return sub-process received a value of two for each variation, the refund sub-process received a value of three for each variation including user preference, and the replace sub-process received a value of one. Thus, the program 104 ranked the sub-process as the refund process in the highest position, which had a higher value due to the user preference variation, and the replace sub-process in the lowest position. In this embodiment and in response to assigning the weighted values to the plurality of variations, the program 104 calculates the overall return score by summing the assigned weight values for each respective variation within the plurality of variations. Then, the program 104 ranks the plurality of sub-processes based on the overall return score of the summation of the plurality of variations using the ranking algorithm. For example, the program 104 will assign a value for the item and product family, segment, fraud, and repeat returner as variations for the return eligibility sub-process. In this embodiment, the program 104 places a sub-process with a higher value higher in the prioritized sequence than a sub-process with a lower value based one the summation of the plurality of variations associated with each sub-process.

In this embodiment and in response to ranking the plurality of sub-process, the program 104 updates the determined sequence of sub-processes based on the prioritized determination of sub-processes. In this embodiment, the program 104 updates the determined sequence by displaying an optimal sequence of the plurality of sub-processes based on the calculated overall return score of the plurality of variations associated with each respective sub-process within the plurality of sub-processes for the return process of the identified item.

In step 208, the program transmits the prioritized sequence of the plurality of sub-process to another computing device via the network 106. In this embodiment and in response to dynamically prioritizing the determined sequence of the plurality of sub-processes associated with the return process of the identified item, the program 104 transmits the prioritized sequence to another computing device associated with a supplier or manufacturer within the supply chain system via the network 106. In another embodiment, the program 104 displays the prioritized sequence of the plurality of sub-processes on a user interface of the computer device 102 for validation by the user. In another embodiment, the program 104 transmits the prioritizes sequence of the plurality of sub-processes to a server computer 108 via the network for storage.

Figure 3:
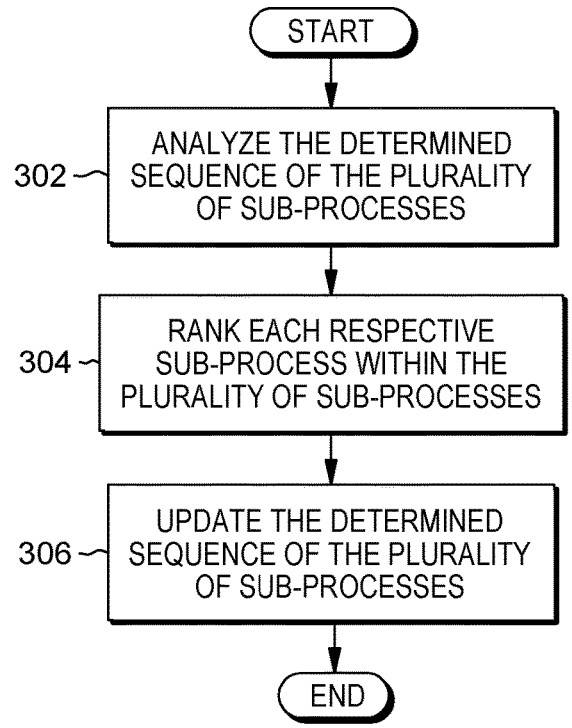
FIG. 3 is a flowchart illustrating operational steps for dynamically prioritizing the determined sequence the plurality of sub-processes based on received data and re-evaluates the overall return process at key milestones, in accordance with at least one embodiment of the present invention.

FIG. 3 is a flowchart 300 illustrating operational steps for dynamically prioritizing the determined sequence the plurality of sub-processes based on received data, in accordance with at least one embodiment of the present invention.

In step 302, the program 104 analyzes the determined sequence of the plurality of sub-processes based on the received data associated with return process of the identified item. In this embodiment, the program 104 analyzes the determined sequence of the plurality of sub-processes by identifying a plurality of variations associated with each respective sub-process within the plurality of sub-processes using the artificial intelligence determination algorithm. For example, the program 104 identifies a plurality of variations such as item and product family characteristics, customer profile and history, fulfillment network and location, and historical rate of return of the item. In another embodiment, the program 104 analyzes the determined sequence of the plurality of sub-process by comparing the identified variations of each respective sub-process to a pre-stored database of variations and a historical baseline associated with the pre-stored variations using the artificial intelligence determination algorithm. In this embodiment, the program 104 retrieves the historical baseline associated with the pre-stored variations from the manufacturer for the identified item.

In step 304, the program 104 ranks each respective sub-process within the plurality of sub-processes within the determined sequence. In this embodiment, the program 104 ranks each respective sub-process within the plurality of sub-processes by assigning a weighted value to each respective variation based on the analysis of each respective sub-process. In this embodiment, the program 104 assigns a weighted value to each respective variation of the plurality of variations for the sub-process that were assigned a weighted value of 1. In this embodiment and in response to assigning weight value to each respective variation associated with the sub-process that was assigned a weighted value of 1, the program 104 generates an overall return score by summing the assigned weight values of the plurality of variations for each respective sub-process. In this embodiment, the program 104 assigns a weight value of 1 for each respective variation that is applicable to the return process of the identified item. For example, the program 104 assigns weighted values of 1 for inventory position, past customer behavior, shipping cost, processing cost, shipping time, and processing time. In this example, the program 104 does not assign a weighted value for the fulfillment network with a store, the return delivery data, and the exchange delivery data. In this example, the program 104 generates an overall return score for the return eligibility sub-process, which initially received a 1 because it was applicable to the return of the golf club, as 6 by summing the applicable variations within the respective sub-process. In this embodiment, the program 104 dynamically prioritizes the determined sequence by ranking each respective sub-process based on the calculated overall score of each respective sub-process associated with the summation of the plurality of the variations. In another embodiment, the program 104 assigns negative values for the respective variations that are not applicable to the return process of the identified item. For example, the program 104 calculates the overall return score from the return eligibility sub-process of the previous example as 3 due to the three variations that were not assigned a weighted value.

In step 306, the program 104 updates the determined sequence of the plurality of sub-processes based on the prioritized determination of sub-processes. In this embodiment, the program 104 updates the determined sequence by displaying an optimal sequence of the plurality of sub-processes based on the calculated overall return score of the plurality of variations associated with each respective sub-process within the plurality of sub-processes for the return process of the identified item.

Figure 4:
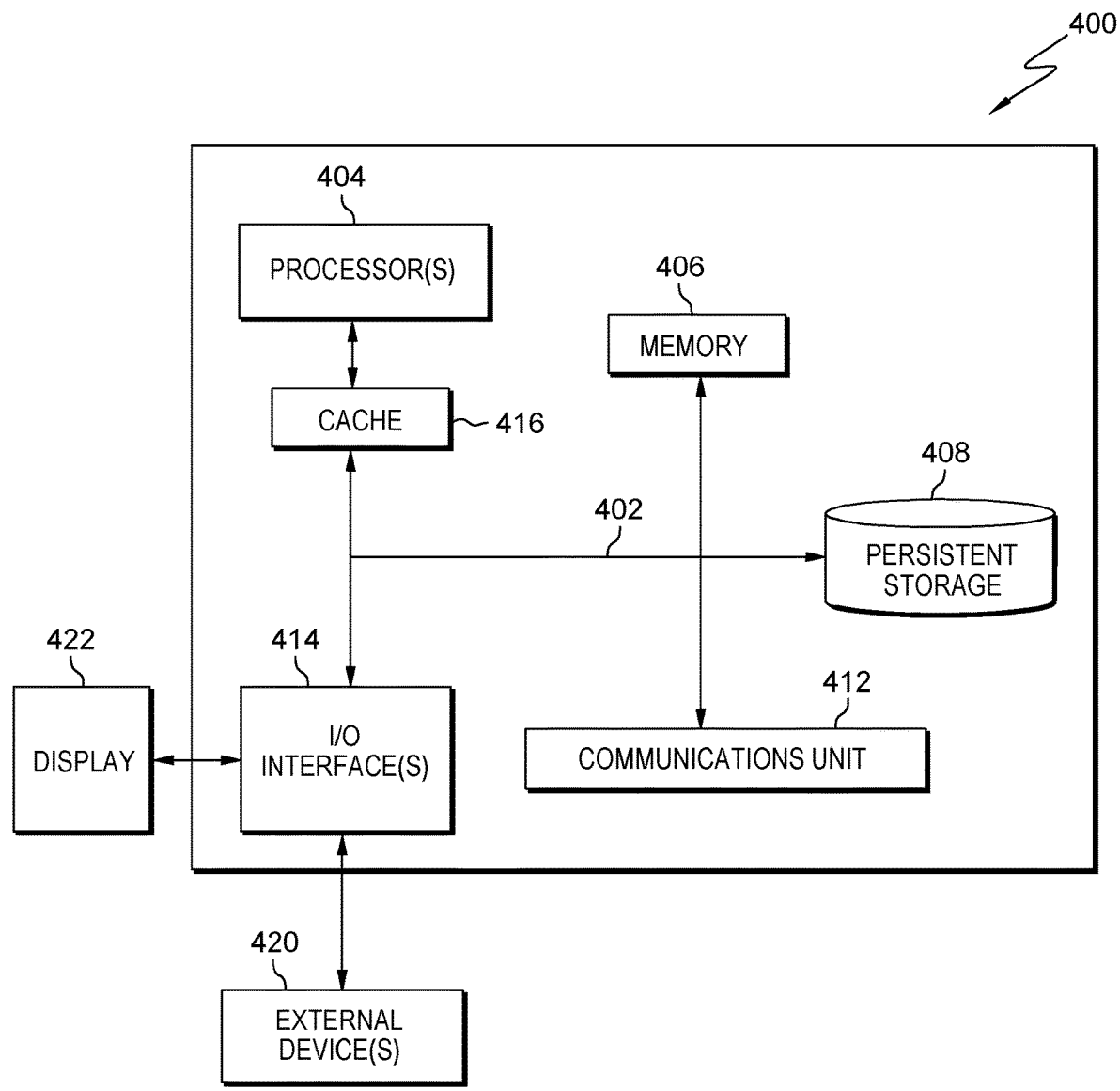
FIG. 4 depicts a block diagram of components of computing systems within a computing display environment of FIG. 1, in accordance with an embodiment of the present invention.

FIG. 4 depicts a block diagram of components of computing systems within a computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 400 includes a communications fabric 402, which provides communications between a cache 416, a memory 406, a persistent storage 408, a communications unit 412, and an input/output (I/O) interface(s) 414. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses or a crossbar switch.

The memory 406 and the persistent storage 408 are computer readable storage media. In this embodiment, the memory 406 includes random access memory (RAM). In general, the memory 406 can include any suitable volatile or non-volatile computer readable storage media. The cache 416 is a fast memory that enhances the performance of the computer processor(s) 404 by holding recently accessed data, and data near accessed data, from the memory 406.

The program 104 may be stored in the persistent storage 408 and in the memory 406 for execution by one or more of the respective computer processors 404 via the cache 416. In an embodiment, the persistent storage 408 includes a magnetic hard disk drive. Alternatively, or in addition to a magnetic hard disk drive, the persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 408 may also be removable. For example, a removable hard drive may be used for the persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 includes one or more network interface cards. The communications unit 412 may provide communications through the use of either or both physical and wireless communications links. The program 104 may be downloaded to the persistent storage 408 through the communications unit 412.

The I/O interface(s) 414 allows for input and output of data with other devices that may be connected to a mobile device, an approval device, and/or the server computer 108. For example, the I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 408 via the I/O interface(s) 414. The I/O interface(s) 414 also connect to a display 422.

The display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    receiving data associated with an initiation of a process;
    dynamically determining a sequence of a plurality of sub-processes associated with the received data based on the initiated process;
    dynamically prioritizing the determined sequence of the plurality of sub-processes associated with the received data based on an analysis of eligible variations and a pre-stored database of variations associated with each respective sub-process;
    dynamically performing the process based the prioritized sequence of the plurality of sub-processes associated with the received data; and
    transmitting a result of the dynamic prioritization of the determined sequence of a plurality of variations to a user interface of another computing device.

2. The computer-implemented method of claim 1, wherein receiving data associated with the initiation of the process comprises:
    identifying an item using sensor devices; and
    retrieving item characteristics associated with the identified item by performing a query of a database stored on a server computing device via a network, wherein the item characteristics are physical descriptors of the item and terms associated with a return of the item.

3. The computer-implemented method of claim 1, wherein dynamically determining the sequence of sub-processes associated with the received data comprises determining an eligibility value of each respective sub-process within the plurality of sub-processes associated with a return process, wherein the sequence of sub-processes is based on the determined eligibility.

4. The computer-implemented method of claim 3, wherein determining the eligibility value of each respective sub-process within the plurality of sub-processes comprises assigning a value to each respective sub-process within the plurality of sub-processes.

5. The computer-implemented method of claim 1, wherein dynamically prioritizing the determined sequence of the plurality of sub-processes comprises:
   analyzing the determined sequence of the plurality of sub-processes based on matching a plurality of variations to a pre-stored database of variations associated with each sub-process within the plurality of sub-processes using an artificial intelligence determination algorithm engine;
   ranking each respective sub-process within the plurality of sub-processes based on the analysis of the determined sequence using a ranking algorithm; and
   dynamically updating the determined sequence based on the ranking of each respective sub-process within the plurality of sub-processes.

6. The computer-implemented method of claim 5, wherein analyzing the determined sequence of the plurality of sub-processes comprises:
   identifying a plurality of variations associated with the plurality of sub-processes associated with identified item using the artificial intelligence determination engine; and
   matching at least one identified variation within the plurality of variations associated with each respective sub-process to a pre-stored database of variations and a historical baseline associated with the pre-stored variations associated with each respective sub-process using the artificial intelligence determination algorithm.

7. The computer-implemented method of claim 5, wherein ranking each respective sub-process comprises:
   assigning a weighted value to each respective variation within a plurality of variations based on the analysis of each respective sub-process of the plurality of sub-process;
   generating an overall return score by summing the assigned weight values of the plurality of variations for each respective sub-process; and
   ranking each respective sub-process based on the generated overall score of each respective sub-process associated with the summation of the plurality of the variations.

8. A computer program product comprising:
   one or more computer readable storage media and program instructions stored on the one or more computer readable storage media, the program instructions comprising:
   program instructions to receive data associated with an initiation of a process;
   program instructions to dynamically determine a sequence of a plurality of sub-processes associated with the received data based on the initiated process;
   program instructions to dynamically prioritize the determined sequence of the plurality of sub-processes associated with the received data based on an analysis of eligible variations and a pre-stored database of variations associated with each respective sub-process;
   program instructions to dynamically perform the process based the prioritized sequence of the plurality of sub-processes associated with the received data; and
   program instructions to transmit a result of the dynamic prioritization of the optimal sequence of the plurality of variations to a user interface of another computing device.

9. The computer program product of claim 8, wherein the program instructions to receive data associated with the initiation of the process comprise:
   program instructions to identify an item using sensor devices; and
   program instructions to retrieve item characteristics associated with the identified item by performing a query of a database stored on a server computing device via a network, wherein the item characteristics are physical descriptors of the item and terms associated with a return of the item.

10. The computer program product of claim 8, wherein the program instructions to dynamically determine the sequence of sub-processes associated with the received data comprise program instructions to determine an eligibility value of each respective sub-process within the plurality of sub-processes associated with a return process, wherein the sequence of sub-processes is based on the determined eligibility.

11. The computer program product of claim 10, wherein the program instructions to determine the eligibility value of each respective sub-process within the plurality of sub-processes comprise program instructions to assign a value to each respective sub-process within the plurality of sub-processes.

12. The computer program product of claim 8, wherein the program instructions to dynamically prioritize the determined sequence of the plurality of sub-processes comprise:
   program instructions to analyze the determined sequence of the plurality of sub-processes based on matching a plurality of variations to a pre-stored database of variations associated with each sub-process within the plurality of sub-processes using an artificial intelligence determination algorithm engine;
   program instructions to rank each respective sub-process within the plurality of sub-processes based on the analysis of the determined sequence using a ranking algorithm; and
   program instructions to dynamically update the determined sequence based on the ranking of each respective sub-process within the plurality of sub-processes.

13. The computer program product of claim 12, wherein the program instructions to analyze the determined sequence of the plurality of sub-processes comprise:
   program instructions to identify a plurality of variations associated with the plurality of sub-processes associated with identified item using the artificial intelligence determination engine; and
   program instructions to match at least one identified variation within the plurality of variations associated with each respective sub-process to a pre-stored database of variations and a historical baseline associated with the pre-stored variations associated with each respective sub-process using the artificial intelligence determination algorithm.

14. The computer program product of claim 12, wherein the program instructions to rank each respective sub-process comprise:
   program instructions to assign a weighted value to each respective variation within a plurality of variations based on the analysis of each respective sub-process of the plurality of sub-process;

program instructions to generate an overall return score by summing the assigned weight values of the plurality of variations for each respective sub-process; and program instructions to rank each respective sub-process based on the generated overall score of each respective sub-process associated with the summation of the plurality of the variations.

15. A computer system comprising:

one or more computer processors;

one or more computer readable storage media; and program instructions stored on the one or more computer readable storage media for execution by at least one of the one or more processors, the program instructions comprising:

program instructions to receive data associated with an initiation of a process;

program instructions to dynamically determine a sequence of a plurality of sub-processes associated with the received data based on the initiated process;

program instructions to dynamically prioritize the determined sequence of the plurality of sub-processes associated with the received data based on an analysis of eligible variations and a pre-stored database of variations associated with each respective sub-process;

program instructions to dynamically perform the process based the prioritized sequence of the plurality of sub-processes associated with the received data; and program instructions to transmit a result of the dynamic prioritization of the optimal sequence of the plurality of variations to a user interface of another computing device.

16. The computer system of claim 15, wherein the program instructions to receive data associated with the initiation of the process comprise:

program instructions to identify an item using sensor devices; and program instructions to retrieve item characteristics associated with the identified item by performing a query of a database stored on a server computing device via a network, wherein the item characteristics are physical descriptors of the item and terms associated with a return of the item.

17. The computer system of claim 15, wherein the program instructions to dynamically determine the sequence of sub-processes associated with the received data comprise program instructions to determine an eligibility value of each respective sub-process within the plurality of sub-processes associated with a return process, wherein the sequence of sub-processes is based on the determined eligibility.

18. The computer system of claim 17, wherein the program instructions to determine the eligibility value of each respective sub-process within the plurality of sub-processes comprise program instructions to assign a value to each respective sub-process within the plurality of sub-processes.

19. The computer system of claim 15, wherein the program instructions to dynamically prioritize the determined sequence of the plurality of sub-processes comprise:

program instructions to analyze the determined sequence of the plurality of sub-processes based on matching a plurality of variations to a pre-stored database of variations associated with each sub-process within the plurality of sub-processes using an artificial intelligence determination algorithm engine;

program instructions to rank each respective sub-process within the plurality of sub-processes based on the analysis of the determined sequence using a ranking algorithm; and program instructions to dynamically update the determined sequence based on the ranking of each respective sub-process within the plurality of sub-processes.

20. The computer system of claim 19, wherein the program instructions to analyze the determined sequence of the plurality of sub-processes comprise:

program instructions to identify a plurality of variations associated with the plurality of sub-processes associated with identified item using the artificial intelligence determination engine; and program instructions to match at least one identified variation within the plurality of variations associated with each respective sub-process to a pre-stored database of variations and a historical baseline associated with the pre-stored variations associated with each respective sub-process using the artificial intelligence determination algorithm.

* * * * *